US009652106B2

(12) United States Patent
Teil et al.

(10) Patent No.: US 9,652,106 B2
(45) Date of Patent: May 16, 2017

(54) TOUCH-SCREEN INTERFACE CIRCUIT (75) Inventors: Vincent Teil, Saubens (FR); Bertrand Clou, Toulouse (FR); Alain Nadiguebe, Scottsdale, AZ (US)

(73) Assignee: NXP USA, Inc., Austin, TX (US)

( * ) Notice: Subject to any disclaimer, the term of this patent is extended or adjusted under 35 U.S.C. 154(b) by 822 days.

(21) Appl. No.: 13/320,575

(22) PCT Filed: Jun. 29, 2009

(86) PCT No.: PCT/IB2009/053230
§ 371 (c)(1),
(2), (4) Date: Nov. 15, 2011

(87) PCT Pub. No.: WO2011/001224
PCT Pub. Date: Jan. 6, 2011

(65) Prior Publication Data
US 2012/0086670 A1   Apr. 12, 2012

(51) Int. Cl.
*G06F 3/045* (2006.01)
*G06F 3/041* (2006.01)

(52) U.S. Cl.
CPC .................................. *G06F 3/045* (2013.01)

(58) Field of Classification Search
None
See application file for complete search history.

(56) References Cited

U.S. PATENT DOCUMENTS

| 5,159,159 | A | 10/1992 | Asher |
| 5,324,895 | A | 6/1994 | Inamori et al. |
| 5,453,941 | A * | 9/1995 | Yoshikawa ............... 178/18.05 |
| 5,717,321 | A | 2/1998 | Kerth et al. |
| 2002/0093491 | A1 * | 7/2002 | Gillespie et al. ............ 345/173 |
| 2007/0139390 | A1 * | 6/2007 | Chen ............................ 345/173 |
| 2009/0189877 | A1 * | 7/2009 | Washino et al. ............. 345/174 |
| 2009/0251436 | A1 * | 10/2009 | Keskin ......................... 345/174 |

OTHER PUBLICATIONS

International Search Report and Written Opinion correlating to PCT/IB2009/053230 dated Feb. 22, 2010.

(Continued)

*Primary Examiner* — Alexander Eisen
*Assistant Examiner* — Nan-Ying Yang (57) ABSTRACT A touch-screen interface circuit configured to operate in at least three modes comprises a first resistive x-plate having at least a first x-terminal connected in the first mode to a voltage supply and a second x-terminal connected in first mode to circuit ground; a voltage regulator circuit comprising a floating reference voltage source connected in first mode to the second x-terminal, and to a first input of a touch-screen reference buffer circuit having a second input connected in first mode to the first x-terminal; the voltage regulator circuit arranged to control in first mode a connection between the voltage supply and the first x-terminal; and a second resistive y-plate having at least a first y-terminal and being arranged to apply a wiper contact to the first x-plate, the wiper contact having an x-position, y-position and pressure.

15 Claims, 9 Drawing Sheets (56) References Cited

OTHER PUBLICATIONS

Wolfson Microelectronics: "WM9705-Multimedia AC'97 CODEC with Integrated Touch Screen Controller" Production Data, Aug. 2006, Rev 4.4, Wolfson Microelectronics plc, http://www.wolfsonmicro.com, pp. 1-55.
Wolfson Microelectronics: "WM9712L-AC'97 Audio and Touchpanel CODEC" Production Data, Aug. 2006, Rev 4.4, Wolfson Microelectronics plc, http://www.wolfsonmicro.com, pp. 1-77.
Burr-Brown Products From Texas Instruments: "TSC2200-PDA Analog Interface Circuit" SBAS191F—Feb. 2001—Revised Apr. 2004, Copyright© 2001-2004, Texas Instruments Incorporated, www.ti.com, pp. 1-43.
International Search Report and Written Opinion correlating to PCT/IB2009/053230 dated Feb. 22, 2010.
Sharp Application Note: LH7xxxx-System-on-Chip: "Using the Sharp ADC with Resistive Touch Screens" Paul Kovitz, Staff Engineer, pp. 1-31, 2001.

* cited by examiner

TOUCH-SCREEN INTERFACE CIRCUIT

FIELD OF THE INVENTION

This invention in general relates to data input devices and more specifically to a touch screen interface circuit.

BACKGROUND OF THE INVENTION

A touch-screen is a display operable to detect a presence and location of a touch within the display area. The term generally refers to touch or contact to the display of the device by a finger, hand or other passive objects, such as a stylus or pen.

A touch screen is typically made out of two transparent layers or plates, one on top of the other. Typically, a resilient material is used to keep the two layers separated. When enough pressure is applied to the surface of a touch-screen (for example, with a stylus or finger), the top layer is brought into contact with the bottom layer, i.e. a wiper contact is established between both layers or plates.

Figure 1:
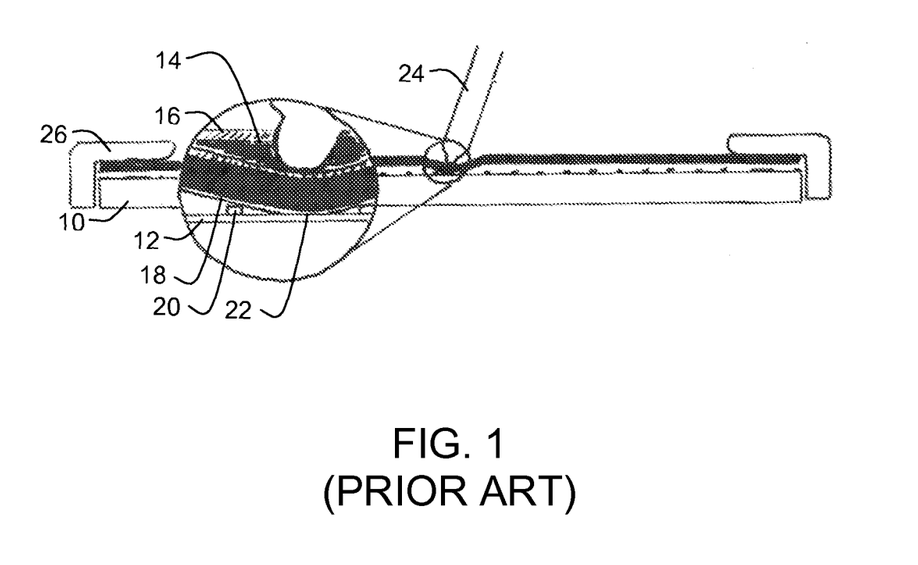
FIG. 1 schematically shows a diagram of an example of a touch screen interface.

As shown in FIG. 1, a resistive touch-screen may have a back layer such as glass 10 with a uniform resistive coating 12, such as for example indium tin oxide (ITO) and a cover layer 14, such as a polyester film, additionally having a hard coat 16, wherein the cover layer 14 also has a resistive coating 18, with the resistive coatings 12, 18 separated by insulating microdot spacers 20. When the screen is touched, for example with a stylus 24, the force of the touch pushes the conductive coating 18 on the coversheet 14 against the coating 12 on the glass 10, allowing for an electrical wiper contact 22. The voltages produced may be analog representations of the position touched, which may be converted into digital X and Y coordinates. The shown screen also has a bezel 26.

Resistive touch-screens may for example be 4- or 8-wire touch-screens or 5- or 7-wire touch screens. Variations using more wires are possible.

Figure 2:
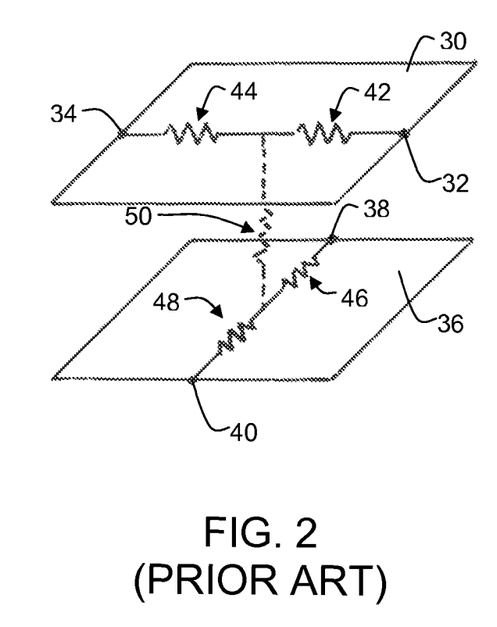
FIG. 2 schematically shows a diagram of an example illustrating a 4-wire touch-screen interface.

4-wire and 8-wire touch screens are made out of two layers of a transparent resistive material that have a uniform surface resistance. For example, as shown in FIG. 2, a 4-wire resistive touch-screen may have a resistive x-plate 30 having a first and a second terminal for example in horizontal direction, which may be referred to as the first 32 and second x-terminals 34, and a resistive y-plate 36 having a first and a second terminal in vertical direction, which may be referred to as the first 38 and second y-terminals 40. Each plate has a resistance which may be represented divided into a first 42 and a second resistance 44 of the x-plate 30 and a first 46 and second resistance 48 of the y-plate 36 when locally bringing both plates into contact. This wiper contact has a contact resistance 50. A controller first applies a supply voltage to the x-plate 30. Upon touch, it probes the voltage received at the y-plate 36, which represents a left-right position or x-position. It then applies supply voltage to the y-plate 36 and probes from the x-plate 30 to calculate a y-position.

Figure 3:
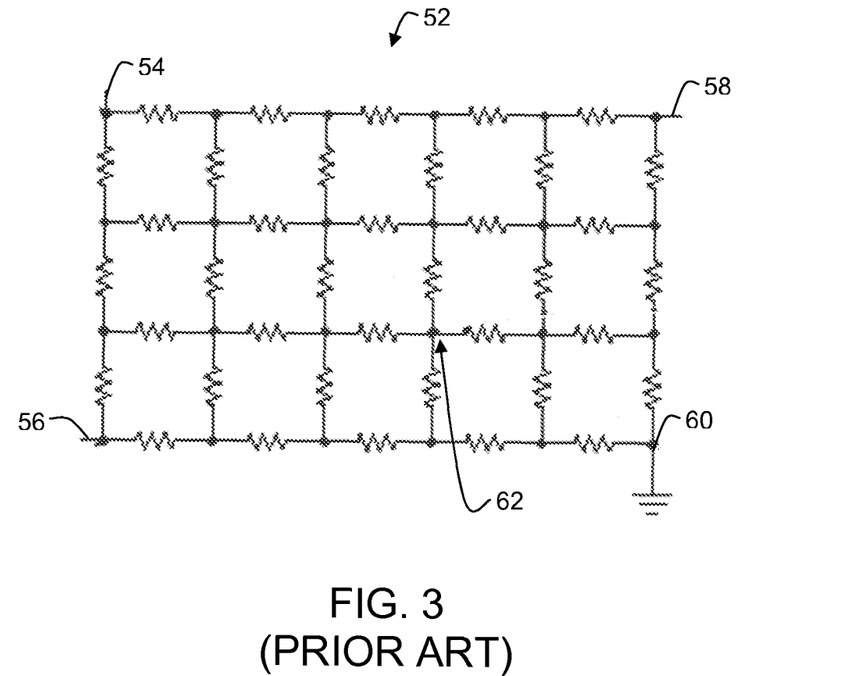
FIG. 3 schematically shows a diagram of an example illustrating a 5-wire touch-screen interface.

5-wire and 7-wire touch screens are made with one resistive layer and one conductive layer which only serves as a probe. For example, as shown in FIG. 3, a 5-wire resistive touch-screen may have an x-plate 52 with a first 54, a second 56, a third 58, and a fourth x-terminal 60. The y-plate or cover-layer (not shown) may only serve as a probe and may have a y-terminal. Touching the y-layer may result in a wiper contact 62 with the x-plate 52. A controller first applies a supply voltage to the first and third x-terminals 54, 58 and grounds the second and the fourth x-terminals 56, 60, causing voltage to flow uniformly across the screen from the top to the bottom. Upon touch, it reads the Y voltage from the coversheet or y-plate at the y-terminal. Then the controller applies the supply voltage to the first and the second x-terminals 54, 56 and grounds the third and fourth x-terminals 58, 60, and reads the X voltage from the y-terminal again.

SUMMARY OF THE INVENTION

The present invention provides a touch-screen interface circuit and a programmable apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 4:
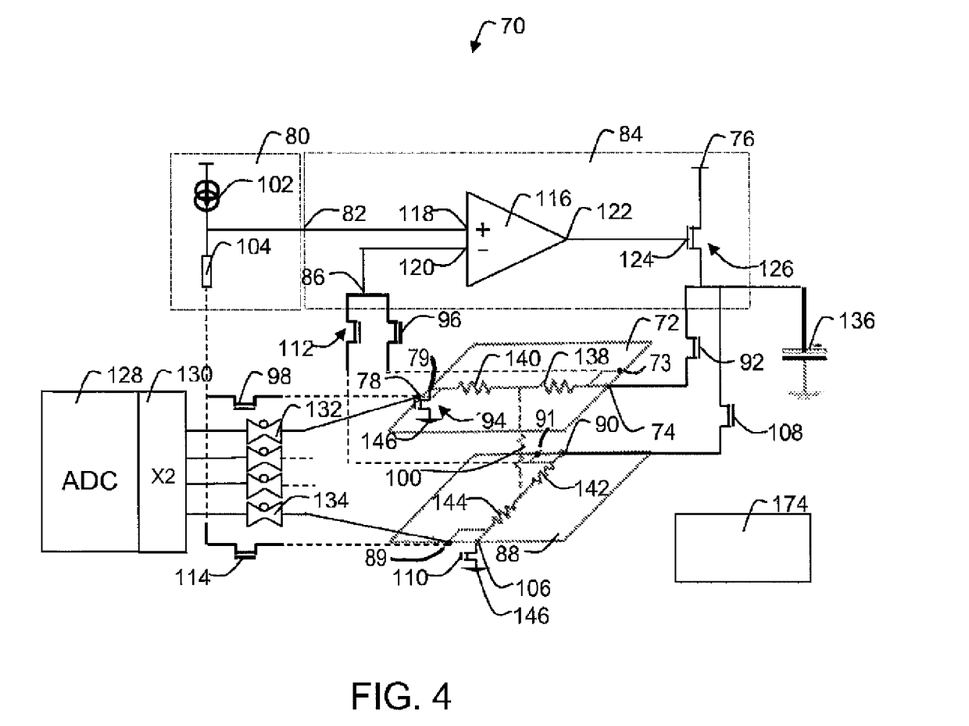
FIG. 4 schematically shows a diagram of a first example of an embodiment of a touch-screen interface circuit.

Referring to FIG. 4, a diagram of a first example of an embodiment of a touch-screen interface circuit is schematically shown. The touch-screen interface circuit 70 may be configured to operate in at least a first, a second and a third mode and may comprise a first resistive x-plate 72 having at least a first x-terminal 74 connected in the first mode to a voltage supply 76 and a second x-terminal 78 connected in the first mode to a circuit ground 146. And it may comprise a voltage regulator circuit 80, 84 comprising a floating reference voltage source 80 connected in the first mode to the second x-terminal 78, and to a first input 82 of a touch-screen reference buffer circuit 84 having a second input 86 connected in the first mode to the first x-terminal 74. The voltage regulator circuit 80, 84 may be arranged to control in the first mode a connection between the voltage supply 76 and the first x-terminal 74. And the touch-screen interface circuit 70 may comprise a second resistive y-plate 88 having at least a first y-terminal 90 and may be arranged to apply a local wiper contact to the first x-plate 72, the wiper contact having an x-position, a y-position and a pressure.

The circuit shown in FIG. 4 may apply to a 4-wire touch-screen. However, it should be noted that this is only for better illustration and the principles shown may easily be applied to other touch-screen implementations, such as 5, 7, or 8-wire touch-screens.

The shown touch-screen interface circuit 70 may allow in the first mode of operation determining a horizontal or x-position of a wiper contact caused by force applied to the touch-screen, for example by a stylus. The x-position of the wiper contact may divide the resistance of the x-plate 72 into a first x-resistance 138 and a second x-resistance 140. In the second mode, the vertical or y-position may be determined. The y-position of the wiper contact may divide the resistance of the x-plate 72 into a first x-resistance 142 and a second x-resistance 144. And in the third mode the pressure caused by the force applied by the stylus may be determined. The voltage supply 76 may provide a supply voltage $V_{cc}$ to the x-plate 72 which may be connected to circuit ground 146. However, in order to activate and de-activate these connections, the first and second x-terminals may comprise a high-side switch 92 and a low-side switch 94. The switches may for example be implemented as transistors, e.g. MOS-transistors. High-side and low-side switches may for example be power switches, carrying for example current of up to 12 mA for a $V_{ref}$ of 1.2 V. To get rid of or at least reduce an influence of parasitic resistances, such as resistances of switches, and to keep the voltage across the x-plate 72 constant even when parasitic resistances are subject to change, the voltage regulator circuit 80, 84 may be connected in the first mode to regulate the voltage across the x-plate 72. The reference voltage generated by the shown floating reference source 80 may allow applying a constant voltage across the x-plate 72. The voltage regulator circuit 80, 84 may be connected in the first mode to the first and second x-terminals 74, 78 which may comprise switches 96, 98. However, since only very low current may flow through the regulator circuit and connecting switches, only little or no drop voltages may occur here. Therefore, these low-current connections to the x-plate 72 and the y-plate 88 are illustrated in FIG. 4 as dashed lines, whereas continuous lines connected to x- and y-terminals may indicate a current flow through them.

It should be noted that the x- and y terminals are illustrated in FIG. 4 as a pair of neighbouring terminals, one for connecting to a continuous line, the other one for connecting to a dashed line. This may symbolize that difference between dashed and continuous lines. However, the x- and y-terminals may either be implemented as terminals connecting to both lines or may indeed be implemented as two neighbouring separate terminals.

The touch-screen reference buffer circuit 84 may receive the reference voltage, which may be applied to the x-plate 72 and may compare it with the voltage actually applied to the x-plate 72 through the first x-terminal 74. However, due to for example parasitic resistances, these voltages may differ and the touch screen reference buffer circuit 84 may control the application of $V_{cc}$ to the touch-screen interface circuit 70 in order to compensate for losses and keep the voltage across the x-plate 72 at a level corresponding to the reference voltage. The y-plate 88 may comprise a y-terminal for receiving a probe voltage corresponding to an x-position of the wiper contact caused for example by a finger touching the touch-screen. As shown, the wiper contact may result in a connection having a contact resistance 100.

Circuit ground 146 may be earth. However, it may be any reference point having a constant potential from which other voltages are measured.

As shown in FIG. 4, the floating voltage reference source 80 may comprise a reference current source 102 and a reference resistor 104, providing the reference voltage $V_{ref}$ as a voltage across reference resistor $R_0$ 104. The reference current source 102 may provide a reference current $I_{ref}=V_{ref}/R_0$.

And for the shown touch-screen interface circuit 70, the second resistive y-plate 88 may comprise the first y-terminal 90 connected in the second mode to the voltage supply 76 and a second y-terminal 106 connected in the second mode to the circuit ground 146; and the voltage regulator circuit 80, 84 may comprise the floating reference voltage source 80 connected in the second mode to the second y-terminal 106 and to the first input 82 of the touch-screen reference buffer circuit 84 having the second input 86 connected in the second mode to the first y-terminal 90. The voltage regulator circuit 80, 84 may be arranged to control in the second mode a connection between the voltage supply 76 and the first y-terminal 90. In the second mode, a voltage corresponding to $V_{ref}$ may be applied across the y-plate and a voltage value of the wiper contact giving the y-position may be received from probing the x-plate. In the embodiment shown in FIG. 4, the first y-terminal 90 may comprise a high-side switch 108 for activation of a connection to the $V_{cc}$ voltage supply 76 and the second y-terminal 106 may comprise a low-side switch 110 for connection to circuit ground 146. And the voltage regulator circuit 80, 84 may be connected in the second mode to the first and second y-terminals which may comprise switches 112, 114.

Using switches may allow for optimizing the silicon size when implementing the circuitry partly in an integrated circuit (IC). However, instead of switching connections to the voltage regulator circuit 80, 84 for different modes, a separate voltage regulator circuit may be provided to be used in each particular mode.

The shown connections and terminals for the y-plate may be suitable for a 4-wire touch-screen. An 8-wire touch-screen may have y-terminals (and x-terminals) doubled. For example, x-plate 72 can include third x-terminal 73 and fourth x-terminal 79, and y-plate 88 can include third y-terminal 91 and fourth v-terminal 89.

For example for a 5-wire touch-screen (and similarly for a 7-wire touch-screen), connections may be different in order to force the reference voltage to the x-plate 72 in the first and second mode. In this case, the first resistive x-plate 72 may comprise at least a third x-terminal (not shown) connected in the first mode to the voltage supply 76 and in a second mode to the circuit ground 146 and a fourth x-terminal (not shown) connected in the first mode and in the second mode to the circuit ground 146. The first and second x-terminals 74, 78 may be connected in the second mode to the voltage supply 76 and the voltage regulator circuit 80, 84 may comprise the floating reference voltage source 80 connected in the first mode to the fourth x-terminal and to the first input 82 of the touch-screen reference buffer circuit 84 having the second input 86 connected in the first mode to the third x-terminal. The voltage regulator circuit 80, 84 may be arranged to control in the first mode a connection between the voltage supply 76 and the third x-terminal; and the voltage regulator circuit 80, 84 may comprise the floating reference voltage source 80 connected in the second mode to the third and fourth x-terminals and to the first input 82 of the touch-screen reference buffer circuit 84 having the second input 86 connected in the second mode to the first and the second x-terminal. The voltage regulator circuit 80, 84 may be arranged to control in the second mode a connection between the voltage supply 76 and the first and second x-terminals.

As described above with example given in FIG. 4, but applying to many common touch-screen architecture chosen, at least some of the terminals of the x-plate and y-plate may comprise one or more switches 92, 94, 96, 98, 108, 110, 112, 114 for activating and deactivating connections to said terminals depending on said first and said second mode.

The touch-screen reference buffer circuit 84 may comprise a differential amplifier circuit 116 having a first amplifier input 118 connected to the first input 82 of the touch-screen reference buffer circuit 84, a second amplifier input 120 connected to the second input 86 of the touch-screen reference buffer circuit 84, and an amplifier output 122 connected to a gate terminal 124 of a transistor device 126 having source and drain terminals connected between the voltage supply 76 and at least one corresponding terminal 74, 90 of the x-plate 72 or y-plate 88, being connected to the voltage supply 76 depending on the first and the second mode.

The touch-screen reference buffer circuit 84 may change the voltage applied to the gate 124 of the transistor 126 depending on changes between the reference voltage and the voltage actually applied to the x-plate 72 or y-plate 88, depending on the mode of operation, connecting $V_{cc}$ to the circuit depending on the sensed deviation from the desired reference voltage $V_{ref}$ to be forced across the particular plate.

The shown transistor device 126 may be one transistor. However, it may represent a plurality of transistors, for example when implementing an 8-wire architecture. The control input 124 of the shown transistor device 126 may be a gate, since the chosen transistor 126 may be a metal oxide semiconductor (MOS) transistor, for example a PMOS or an NMOS transistor. However, different implementations, for example as a bipolar transistor having a base, may be possible. The transistor may have source and drain terminals (emitter and collector, respectively).

As shown in FIG. 4, the touch-screen interface circuit 70 may comprise a differential analog-to-digital converter (ADC) 128. It may be connected to receive in the first mode an x-voltage value corresponding to the x-position of the wiper contact from the y-plate 88 or in the second mode a y-voltage value corresponding to the y-position of the wiper contact from the x-plate 72 or the y-plate 88. For the shown architecture, the y-voltage value may be received from the x-plate 72. However, for example when using a 5-wire architecture, the y-voltage value corresponding to the y-position of the wiper contact may be received from the y-plate 88.

The digital word length chosen for the ADC may be 8 or more bits, for example 10 bits, depending on the targeted application of the touch-screen.

In the third mode a current source may be connected to the first y-terminal 90, and the second x-terminal 78 may be connected to the circuit ground 146 and the ADC 128 may be connected to receive a voltage difference between the first x-plate 72 and the second y-plate 88. The current source may for example be the reference current source 102. However, a different current source may be used. Applying a known current through the plates via the wiper contact may result in a contact voltage at wiper contact resistance 100 corresponding to the pressure applied e.g. by a stylus or finger generating the wiper contact. The ADC 128 may comprise a plurality of signal inputs and switches, such as switches 132, 134 for activating a particular input. Switches 132, 134 may for example connect the ADC 128 to receive the potentials of the x-plate and the y-plate measured at the second x-terminal 78 and second y-terminal 106 during pressure measurement. The measured voltage may correspond to the pressure applied for enabling the wiper contact.

The touch-screen reference circuit 84 may apply the reference voltage to the x-plate or the y-plate. The reference voltage may be chosen taking into account that the active power applied to the touch-screen circuit 70 may be reduced. This may allow for example for low-power switches which may be implemented on a smaller portion of an integrated circuit die comprising at least a portion of the touch-screen interface circuit 70. Therefore, the floating reference voltage source 80 may be configured to provide a reference voltage having a voltage level lower than a full scale input voltage range of the ADC 128. For example, the provided reference voltage $V_{ref}$ may be equal or less than half of the full scale input voltage range of the ADC 128. For example, the ADC 128 may have a full scale input voltage range of 2.4 Volts and the reference voltage $V_{ref}$ may be 1.2 Volts. This may e.g. reduce the power consumption of the touch-screen interface circuit. For example, power switches 92, 108 may switch current up to 12 mA (milli Ampere) for an overall plate resistance of 100 Ohms to 1000 Ohms. Without the provided circuitry 2.4 Volts had to be applied to the plate for using the full scale input voltage range of the ADC, causing a current flow of about 24 mA. Therefore, power switches for force lines according to the presented system may be implemented with a reduced size. Reduced current flow across the plates may also improve screen lifetime. And the circuit may allow for more headroom regarding $V_{cc}$ supply. For example, the voltage applied to a plate will be about 2.2 V for a $V_{cc}$ of 2.75 V. And the provided touch-screen reference circuit may allow for die size optimization due to directly generating a reference voltage while avoiding for example usage of resistor ladders to generate reference above bandgap voltage.

In the shown embodiment, the touch-screen interface circuit 70 may also comprise a scaling unit 130 connected to the ADC 128, configured to amplify received voltage levels by a factor given by a ratio of the full scale input voltage range of the ADC 128 and the reference voltage. This may allow increasing touch-screen resolution by employing the full ADC resolution. For example, a reference voltage less than half of the ADC resolution may be scaled by factor or multiplier 2 in order to make use of the full ADC resolution.

Still referring to FIG. 4, the touch-screen interface circuit may comprise a stabilization capacitor 136 connected to the first x-terminal 74. The connection may be via high-side switch 92 comprised by the x-terminal 74. The stabilization capacitor 136 may be operated on the touch-screen reference voltage level and may serve as a low pass filter, thus stabilizing the voltage provided to the x-plate 72, filtering voltage changes and smoothing peaks caused by the switching, e.g. caused by the voltage regulator output. As shown in FIG. 4, the stabilization capacitor may also be connected to stabilize the voltage provided to the y-plate 88.

The stabilization capacitor 136 may for example be part of the integrated circuit chip or maybe implemented as a chip mounted surface (CMS) component.

Figure 5:
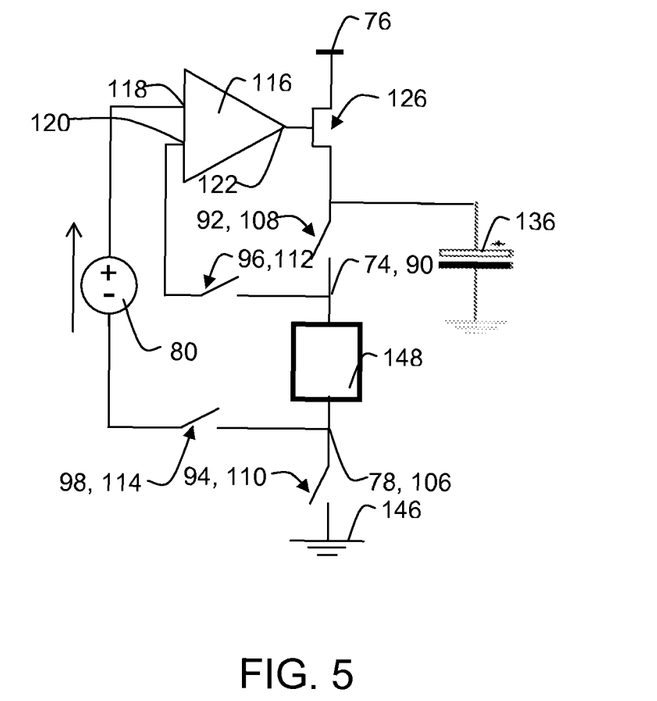
FIG. 5 schematically shows a diagram of a second example of an embodiment of a touch-screen interface circuit.

Referring now also to FIG. 5, a diagram of a second example of an embodiment of a touch-screen interface circuit is schematically shown. The shown diagram may be another illustration of the first example of an embodiment of a touch-screen circuit shown in FIG. 4, being either in the first or the second mode. Reference numerals applying to the first and to the second example may refer to similar or identical components. Since for a 4-wire architecture FIG. 4 may refer to a touch-screen interface circuit either in the first or second mode of operation, two reference numerals may be used for one shown component. The minimum resistance of the first x-plate or the second y-plate may be presented as a single resistance 148. The voltage regulator circuit comprising the reference voltage source 80, a differential amplifier 116 having two inputs 118, 120 and an output 126 may be used for controlling application of $V_{cc}$ provided by voltage supply 76 by regulating a control input or gate of a transistor device 126 connected between the first terminal 74, 90 of the currently connected plate having the resistance 148 and being connected to circuit ground 146. Capacitor 136 may serve as a stabilization capacitor. High-side force switches 92, 108 and low-side force switches 78, 106 may be closed for applying the voltage across the particular plate resistance 148. Sense switches 98, 114 and 96, 112 may be closed for connecting the voltage regulation circuit to the particular plate.

Figure 6:
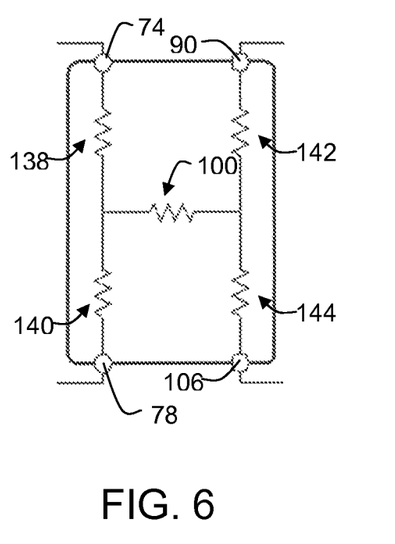
FIG. 6 schematically shows a diagram of a first example of a 4-wire touch-screen according to an embodiment of the touch-screen interface circuit.

Referring now also to FIG. 6, a diagram of a first example of a 4-wire touch-screen according to an embodiment of the touch-screen interface circuit is schematically shown. Identical reference numerals may refer to identical or similar components. When in first mode of operation, the x-position of the wiper contact may be determined by applying reference voltage Vref to the first x-terminal 74 and ground to the second x-terminal 78 and connecting the y-plate first y-terminal 90 to the ADC's input $ADCIN_+$, and the y-plate second y-terminal 106 to ADC input $ADCIN_-$, giving the x-position as a ratio of the differential voltage $ADCIN_+$-$ADCIN_-$ and Vref, given that an x-coordinate or x-position is determined as the ADC code of the difference of coordinates TSY1-TSX2, divided by the maximum resolution, if the full scale abscissa is 1. For example, the maximum resolution may be 1024 for a 10 bit ADC. TSX1, TSX2, TSY1 and TSY2 may refer to the x- and y-coordinates of the first and second x- and y-terminals connected to the touch-screen display.

Figure 7:
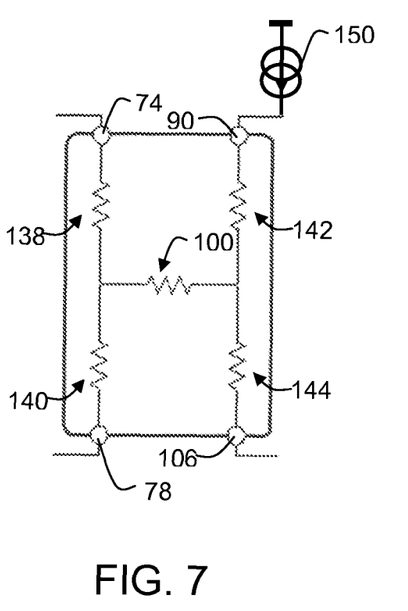
FIG. 7 schematically shows a diagram of a second example of a 4-wire touch-screen according to an embodiment of the touch-screen interface circuit.

When in second mode of operation, the y-position of the wiper contact may be determined by applying reference voltage Vref to the first y-terminal 90 and ground to the second y-terminal 106 and connecting the x-plate first x-terminal 74 to the ADC's input $ADCIN_+$, and the x-plate second x-terminal 78 to ADC input $ADCIN_-$, giving the y-position as the ratio of the differential voltage $ADCIN_+$-$ADCIN_-$ and V ref, given that a y-coordinate or y-position on the screen is determined as the ADC code of the difference of coordinates TSX1-TSY2, divided by the maximum resolution, if the full scale abscissa is 1. For example, the maximum resolution may be 1024 for a 10 bit ADC. Referring now also to FIG. 7, a diagram of a second example of a 4-wire touch-screen according to an embodiment of the touch-screen interface circuit is schematically shown. Identical reference numerals may refer to identical or similar components. When in third mode of operation, the pressure of a touch by a pen, stylus, finger etc. may be determined by determining the resistance 100 between first and second plate. A known current, for example about 0.1 mA, may be provided by a current source 150 to the first y-terminal 90, while applying ground to the second x-terminal 78. As an example, the current source may be the reference current source shown in FIG. 4. The voltage difference $ADCIN_+$-$ADCIN_-$ measured using the ADC between first x-terminal 74 and second y-terminal 106 may then equal the voltage across the contact resistance 100, which is given by the ratio of $ADCIN_+$-$ADCIN_-$ and the current provided by the current source 150, which may be Iref.

Figure 8:
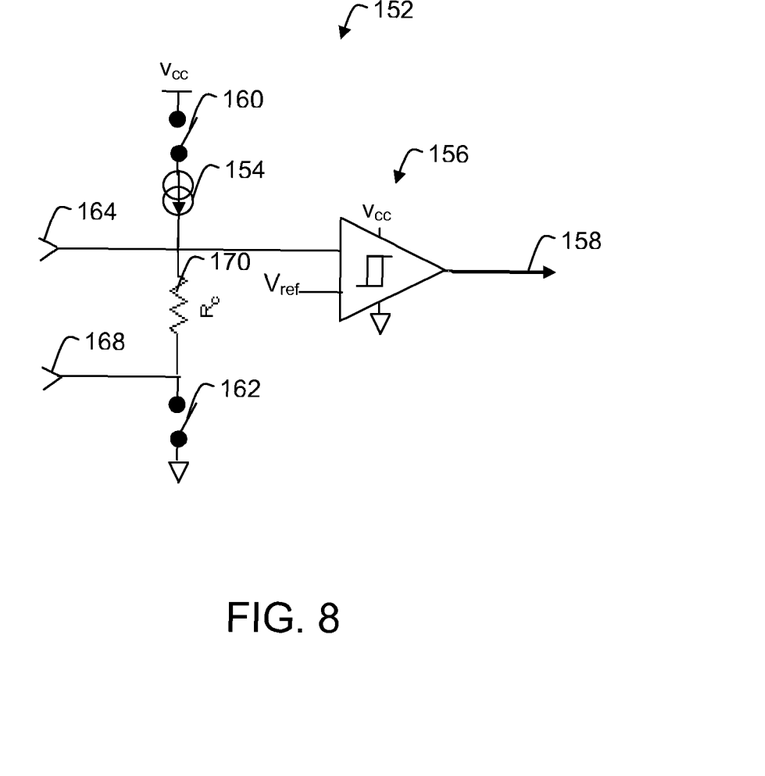
FIG. 8 schematically shows a diagram of an example of a stand-by pen detection circuit according to an embodiment of the touch-screen interface circuit.

Referring now also to FIG. 8, a diagram of an example of a stand-by pen detection circuit according to an embodiment of the touch-screen interface circuit is schematically shown. The touch-screen interface may comprise a stand-by pen detection circuit 152 for detecting in a stand-by mode a voltage change between the first x-plate and the second y-plate, having a comparator 156 comprising a first input connected to receive a wiper contact voltage and a second input connected to the floating reference voltage source and providing an interrupt signal 158 on an output of the comparator.

For example, terminals 164 and 168 may connect the stand-by pen detection circuit in a 4-wire architecture to the first x-terminal and the first y-terminal, respectively. For a 5-wire architecture, terminals 164 and 168 may for example be connected to the wiper y-terminal and the first x-terminal, respectively. During a pen-detection enabled state, both switches 160, 162 may be open. A pen may cause a wiper contact and a voltage drop across the contact resistance 170, which may be detected by comparator 156 comparing the received voltage drop with a reference voltage Vref. The comparator 156 may for example be implemented as a Schmidtt trigger, allowing stable provision of an interrupt signal on detection of a touch e.g. by a pen. Generation of an interrupt signal may end stand-by mode, may close the switches 160, 162 and may allow for current flow driven by a current source 154 which may be the reference current source shown in FIG. 4. However, in stand-by mode, no quiescent current may occur, allowing for a reduced power consumption during standby-mode.

Referring back to FIG. 4, the touch-screen interface circuit 70 may comprise a controller unit 174 configured to apply the first mode and determine the x-position, apply the second mode and determine the y-position, and apply the third mode and determine the pressure of the wiper contact. The controller unit 174 may, for some or each touch received by a touch-screen interface 70, switch the touch-screen interface circuit into the first, second and third state and determine x-position, y-position and pressure. Only three analog-to-digital conversions may be performed for determining the three parameter values.

For the example shown in FIG. 4, the controller unit 174 may for example perform in the first mode of operation at least the following steps: It may close the x-plate first high-side switch 92 and the first low-side switch 94 for application of $V_{ref}$ to the x-plate 72. And it may connect the first 90 and second y-terminal 106 of the y-plate 88 to the ADC 128 for a determination of a differential voltage between both terminals and a first ADC conversion.

The controller unit 174 may perform in the second mode of operation for example the following steps: It may close the y-plate first high-side switch 108 and the first low-side switch 110 for application of $V_{ref}$ to the y-plate 88. And it may connect the first 74 and second x-terminal 78 of the x-plate 72 to the ADC 128 for a determination of a differential voltage between both terminals and a second ADC conversion.

The controller unit 174 may perform in the third mode of operation for example the following steps: It may close the y-plate first high-side switch 108 and connect a known reference current to the first y-terminal and close the x-plate low-side switch 94, causing the known current to flow across the contact resistance 100 to the y-plate. And it may connect the first x- and second y-terminal to the ADC 128 for determination of a voltage across the contact resistance 100 for a third ADC conversion.

The number of ADC conversions may therefore be as few as three, while avoiding post-processing of the values, since each conversion directly delivers a digital parameter value, i.e computation effort required for calculating a touch position may be reduced.

The controller unit 174 may for example be configured to control either 4, 8 wires touch-screens or 5, 7 wires touch-screens. By setting the reference voltage for example to half or to full scale ADC reference, the touch-screen controller unit may be adapted to any high speed or high resolution ADC.

Figure 9:
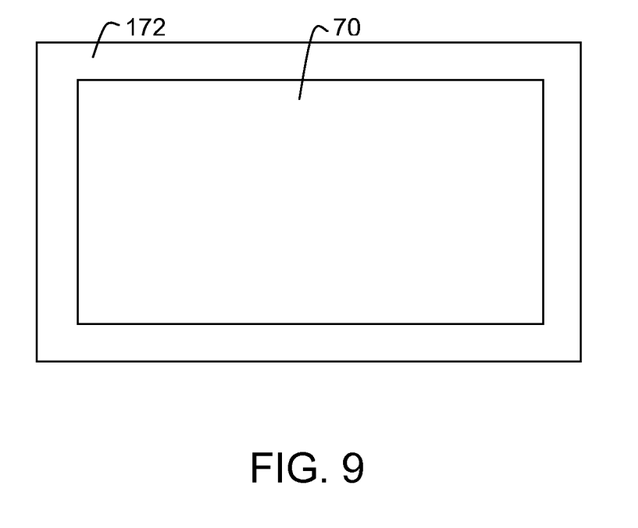
FIG. 9 schematically shows a diagram of an embodiment of a programmable apparatus comprising a touch-screen interface circuit.

Referring now also to FIG. 9, a diagram of an embodiment of a programmable apparatus 172 comprising a touch-screen interface circuit 70 is shown. The programmable apparatus 172 may comprise a touch-screen interface circuit 70 as described above. The programmable apparatus may for example be a personal digital assistant (PDA), a mobile phone, a portable media player, a satellite navigation device, a point-of-sale system, or any other programmable apparatus e.g. used in an industrial, medical or office automation as well as consumer electronics environment.

And a computer program product may comprise code portions for implementing parts of a touch-screen interface circuit 70 as described above when run on a programmable apparatus.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also at least partly be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under", "horizontal", "vertical" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 4 and the discussion thereof describe an exemplary touch-screen interface circuit architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of touch-screen interface circuit 70 are circuitry located on a single integrated circuit or within a same device. Alternatively, touch-screen interface circuit 70 may include any number of separate integrated circuits or separate devices interconnected with each other. For example, the controller unit 174 may be located on a same integrated circuit as the voltage regulator circuit 80, 84 or on a separate integrated circuit or located within another peripheral or slave discretely separate from other elements of circuit 70. Also for example, touch-screen interface circuit 70 or portions thereof may be soft or code representations of physical circuitry or of logical representations convertible into physical circuitry. As such, circuit 70 may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. The programmable apparatus may for example comprise a processing device or processing unit being one or more of a group consisting of: microprocessor, central processing unit, a graphics processor, coprocessor, digital signal processor, embedded processor application specific integrated circuit (ASIC), field programmable gate array (FPGA), programmable logic array (PLA), a device implementing a state machine, a microcontroller unit (MCU).

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A touch-screen interface circuit, configured to operate in at least a first, a second and a third mode, comprising:
    a first resistive x-plate having
        at least a first x-terminal connected in said first mode to a voltage supply and
        a second x-terminal connected in said first mode to a circuit ground;
    a voltage regulator circuit comprising
        a floating reference voltage source connected in said first mode to said second x-terminal, and to a first input of
        a touch-screen reference buffer circuit having a second input connected in said first mode to said first x-terminal; said voltage regulator circuit arranged to control in said first mode a connection between said voltage supply and said first x-terminal; and
    a second resistive y-plate having at least a first y-terminal and being arranged to apply a local wiper contact to said first x-plate, said wiper contact having an x-position, a y-position and a pressure.

2. The touch-screen interface circuit as claimed in claim 1, wherein said floating voltage reference source comprises a reference current source and a reference resistance.

3. The touch-screen interface circuit as claimed in claim 1, wherein said second resistive y-plate comprises
    said first y-terminal connected in said second mode to said voltage supply and
    a second y-terminal connected in said second mode to said circuit ground; and wherein said voltage regulator circuit comprises
    said floating reference voltage source connected in said second mode to said second y-terminal and to said first input of said touch-screen reference buffer circuit having said second input connected in said second mode to said first y-terminal;
said voltage regulator circuit arranged to control in said second mode a connection between said voltage supply and said first y-terminal.

4. The touch-screen interface circuit as claimed in claim 1, wherein said first resistive x-plate comprises
    at least a third x-terminal connected in said first mode to said voltage supply and in a second mode to said circuit ground and
    a fourth x-terminal connected in said first mode and in said second mode to said circuit ground;
    said first and second x-terminals connected in said second mode to said voltage supply; and wherein said voltage regulator circuit comprises
    said floating reference voltage source connected in said first mode to said fourth x-terminal and to said first input of said touch-screen reference buffer circuit having said second input connected in said first mode to said third x-terminal;
said voltage regulator circuit arranged to control in said first mode a connection between said voltage supply and said third x-terminal; and wherein
said voltage regulator circuit comprises
    said floating reference voltage source connected in said second mode to said third and fourth x-terminals and to said first input of said touch-screen reference buffer circuit having said second input connected in said second mode to said first and said second x-terminal;
said voltage regulator circuit arranged to control in said second mode a connection between said voltage supply and said first and second x-terminals.

5. The touch-screen interface circuit as claimed in claim 1, wherein at least some of said terminals of said x-plate and y-plate comprise one or more switches for activating and deactivating connections to said terminals depending on said first and said second mode.

6. The touch-screen interface circuit as claimed in claim 1, wherein said touch-screen reference buffer circuit comprises
    a differential amplifier circuit having
        a first amplifier input connected to said first input of said touch-screen reference buffer circuit,
        a second amplifier input connected to said second input of said touch-screen reference buffer circuit, and
        an amplifier output connected to a gate terminal of a transistor device having source and drain terminals connected between said voltage supply and at least one corresponding terminal of said x-plate or y-plate, being connected to said voltage supply depending on said first and said second mode.

7. The touch-screen interface circuit as claimed in claim 1, comprising
a differential analog-to-digital converter (ADC) connected to receive in said first mode an x-voltage value corresponding to said x-position of said wiper contact from said y-plate or in said second mode a y-voltage value corresponding to said y-position of said wiper contact from said x-plate or said y-plate.

8. The touch-screen interface circuit as claimed in claim 7, wherein in said third mode a current source is connected to said first y-terminal, and said second x-terminal is connected to said circuit ground and said ADC is connected to receive a voltage difference between said first x-plate and said second y-plate.

9. The touch-screen interface circuit as claimed in claim 7, wherein said floating reference voltage source is configured to provide a reference voltage having a voltage level lower than a full scale input voltage range of said ADC.

10. The touch-screen interface circuit as claimed in claim 9, comprising a scaling unit connected to said ADC, configured to amplify received voltage levels by a factor given by a ratio of said full scale input voltage range of said ADC and said reference voltage.

11. The touch-screen interface circuit as claimed in claim 1, comprising a stabilization capacitor connected to said first x-terminal.

12. The touch-screen interface circuit as claimed in claim 1, comprising
a stand-by pen detection circuit for detecting in a stand-by mode a voltage change between said first x-plate and said second y-plate, having
a comparator comprising a first input connected to receive a wiper contact voltage and a second input connected to said floating reference voltage source and providing an interrupt signal on an output of said comparator.

13. The touch-screen interface circuit as claimed in claim 1, comprising
a controller unit configured to apply said first mode and determine said x-position, apply said second mode and determine said y-position, and apply said third mode and determine said pressure of said wiper contact.

14. A programmable apparatus, comprising a touch-screen interface circuit as claimed in claim 1.

15. A non-transitory medium readable by a programmable apparatus, storing data comprising code portions for implementing parts of a touch-screen interface circuit as claimed in claim 1 when run on said programmable apparatus.

\* \* \* \* \*